(12) United States Patent
Smith et al.

(10) Patent No.: US 7,710,281 B2
(45) Date of Patent: *May 4, 2010

(54) REMOTE TAPPING METHOD AND SYSTEM FOR INTERNALLY TAPPING A CONDUIT

(75) Inventors: Mark A. Smith, Natrona Heights, PA (US); Bryan St. Onge, Hastings (CA); Joan Bondira, Pittsburgh, PA (US)

(73) Assignee: Underground Solutions Technologies Group, Inc., Poway, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 11/903,518

(22) Filed: Sep. 21, 2007

(65) Prior Publication Data

US 2008/0100461 A1    May 1, 2008

Related U.S. Application Data

(63) Continuation of application No. 10/959,903, filed on Oct. 6, 2004, now Pat. No. 7,292,156.

(60) Provisional application No. 60/509,424, filed on Oct. 7, 2003.

(51) Int. Cl.
*G08B 21/00* (2006.01)

(52) U.S. Cl. ............... 340/603; 340/691.7; 340/825.29; 340/5.73

(58) Field of Classification Search ................. 340/603, 340/612, 614–617, 626–627, 648, 672–683, 340/691.7, 825.23, 825.29, 5.31, 5.73
See application file for complete search history.

(56) References Cited

U.S. PATENT DOCUMENTS

| | | | |
|---|---|---|---|
| 3,779,413 A * | 12/1973 | Pickerell et al. ............ 215/11.6 |
| 4,331,170 A | 5/1982 | Wendell | |
| 4,434,816 A | 3/1984 | De Giovanni et al. | |
| 4,647,256 A * | 3/1987 | Hahn et al. ................. 405/184 |
| 4,951,758 A | 8/1990 | Sonku et al. | |
| 5,207,031 A * | 5/1993 | Gammelgaard ............. 451/440 |
| 5,253,956 A | 10/1993 | Fisco et al. | |
| 5,655,283 A | 8/1997 | Driver et al. | |
| 5,660,202 A | 8/1997 | Rush, Jr. et al. | |
| 5,737,822 A | 4/1998 | Driver et al. | |

(Continued)

FOREIGN PATENT DOCUMENTS

DE    40 24 926 A1    2/1992

(Continued)

*Primary Examiner*—Daniel Previl
(74) *Attorney, Agent, or Firm*—The Webb Law Firm

(57) ABSTRACT

Disclosed is a method, system and apparatus for use in remotely and internally tapping a conduit. The method is performed, at least partially, by an automatic mechanism or robot configured to effectively perform the tasks and various steps of the method. The method includes the steps of: (a) lining a conduit with a liner; and (b) inserting an automatic mechanism into an internal portion of the liner, wherein the automatic mechanism (i) locates a service tap connection point; and (ii) at least partially engages a fitting device within an internal surface of the service tap entry portion, thereby providing fluid communication between a service tap internal passageway and an internal portion of the liner. An automatic mechanism, a fitting device and an insert element are also disclosed.

20 Claims, 8 Drawing Sheets

U.S. PATENT DOCUMENTS

| | | | |
|---|---|---|---|
| 5,794,662 A * | 8/1998 | St. Onge et al. | 138/97 |
| 5,960,882 A * | 10/1999 | Polivka | 166/297 |
| 6,446,670 B1 | 9/2002 | Woodward et al. | |
| 7,131,791 B2 | 11/2006 | Whittaker et al. | |
| 2004/0078954 A1 | 4/2004 | Crocker et al. | |
| 2007/0220733 A1 | 9/2007 | Crocker et al. | |

FOREIGN PATENT DOCUMENTS

| | | | |
|---|---|---|---|
| EP | 0 326 412 | * | 1/1989 |
| EP | 0326412 | B1 | 5/1992 |
| EP | 0391046 | B1 | 12/1992 |
| EP | 1488160 | B1 | 8/2006 |
| EP | 1368591 | B1 | 2/2007 |
| WO | 0055539 | A1 | 9/2000 |
| WO | 02073081 | A1 | 9/2002 |
| WO | WO 03/078886 | A1 | 9/2003 |

* cited by examiner

REMOTE TAPPING METHOD AND SYSTEM FOR INTERNALLY TAPPING A CONDUIT

CROSS REFERENCE TO RELATED APPLICATIONS

This application is a continuation of U.S. patent application Ser. No. 10/959,903, filed Oct. 6, 2004, which claims priority to U.S. Provisional Patent Application No. 60/509,424, filed Oct. 7, 2003, which are incorporated herein by reference in their entirety.

BACKGROUND OF THE INVENTION

1. Field of the Invention

The present invention relates generally to methods and systems for tapping or connecting a service tap to a conduit, such as a water main, a liner or the like and, in particular, to a remote tapping method and system for internally tapping or reestablishing a tap point for a conduit, such as a host conduit lined with a liner.

2. Description of Related Art

Conduit systems are used extensively throughout the world in order to transfer or convey material, such as water and other fluids, from location to location for distribution throughout the system. For example, extensive conduit systems are used to distribute water to both residences and businesses for use and further processes. Typically, such conduit or piping systems are located underground, as aboveground piping would be both unsightly and intrusive.

Typical water conduit systems transport material through pipe, e.g., cast iron, ductile iron, reinforced concrete, cement-asbestos, etc., buried underground with the branches extending in various directions in order to reach the end user. Normally, after many years of use, or for some other reason, the present piping fails and begins to leak, thereby reducing line pressure and unnecessarily allowing water to leak into the area surrounding the piping. Such leaks not only affect the system but increase the processing costs of the supplier, which, in turn, increases the end user costs. Therefore, these leaks must be quickly repaired and preventative measures taken to ensure that further leakage is prevented.

Due to the underground positioning of the conduit system, repairing a leaking pipe is particularly labor intensive and time consuming. Trenches must be dug along the pipeline to locate the leak and effectively repair it prior to putting the pipe back in service. Various lining systems have been developed according to the prior art in an attempt to seal a leaking pipe or a pipe that has fallen into disrepair, whether to repair a present crack or to preventatively ensure against future cracks or breaks. In addition, the use of a much smaller diameter pipe within the larger diameter cracked or broken pipe has been used. However, this merely replaces the problem of a cracked outer pipe with a cracked or otherwise leaking inner pipe. Still further, using such a pipe-in-pipe system drastically reduces the flow through the conduit system and evidences unwanted and varying pressure parameters.

To that end, a pipe liner and method of installation have been developed, as disclosed in U.S. Pat. No. 5,794,662 to St. Onge et al., specifically directed to pressurized pipeline applications. The St. Onge patent is directed to a method of relining sewer lines, water lines or gas lines, and uses a segmented liner of reduced size relative to the pipe being relined. However, as opposed to merely leaving the small diameter liner conduit within the large diameter outer conduit, the method of the St. Onge patent uses heat and/or pressure to mold the reduced size pipe to the shape of the pipe being relined. In particular, the inner or liner conduit is a thermoplastic pipe, typically a polyvinyl chloride (PVC) pipe that, when exposed to heat or pressure, expands and molds against the inside of an existing conduit to effect the relining of it. This process allows for both the lining of the entire length of pipe or only a portion of it that is damaged, which is typically referred to as "spot repair."

According to the St. Onge patent, once the length of the liner conduit is inserted into the existing or host conduit, the liner conduit is plugged at either end and exposed to steam under pressure to heat the liner conduit along its length and apply pressure which urges it to expand and contact the interior walls of the surrounding host conduit. Once the liner conduit has fully expanded to conform to the interior surface of the existing conduit, it is cooled and the plugs are removed. The resulting expanded liner conduit conforms to the walls of the host conduit, thereby preventing any further leakage. Also, the method of the St. Onge patent requires only trenches to be dug at either end of the section to be repaired.

While the St. Onge patent represents an advance in the art of relining or repairing underground conduit systems, there is room in the art for additional improvements and advancements. When initially constructing a water main conduit in a trench, the conduit is fitted with various service taps along its length. These service taps are used to draw water from the main conduit and provide controlled flow through a service conduit or line to a dwelling, business, site, property, etc. After the service taps are positioned and integrated with the main conduit, and the service conduits are attached thereto, the exposed water main is covered and the trench filled in.

A drawback in the art presents itself when, after the host conduit is lined with the liner conduit, as discussed above or in any "lining" method and system as is known in the art, the liner is now blocking the service taps. In order to reestablish the service tap entrance to the water main conduit, another trench must be excavated to access the service tap and allow a subsequent tap entrance to be formed through the liner or liner conduit. This represents a large undertaking, in that, in any given length of the water main, multiple service taps are present, such that great lengths of the water main must be excavated and exposed in order to reestablish the tap points.

SUMMARY OF THE INVENTION

It is, therefore, an object of the present invention to provide a remote tapping method and system for internally tapping a conduit that overcomes the deficiencies of the prior art. It is another object of the present invention to provide a remote tapping method and system that eliminates the need for excavating a buried conduit in order to position and reestablish service taps. It is a further object of the present invention to provide a remote tapping method and system that can remotely locate a preexisting service tap point for reestablishing a tap point entrance for a service tap. It is yet another object of the present invention to provide an automatic mechanism for remotely tapping one or more service tap connection points on a conduit. It is a further object of the present invention to provide an insert element for use in connection with tapping a service tap connection point on a conduit. It is a further object of the present invention to provide a fitting device for use in connection with tapping a service tap connection point on a conduit.

The present invention is directed to a remote tapping method, system and apparatus for use in connection with a host conduit lining process. The lining process may be an expanded lining process or an unexpanded lining process. The method is performed, at least partially, by an automatic mechanism, such as a robotic mechanism, that is configured to effectively perform the tasks and various steps of the method. In particular, the present invention is directed to a method for remotely tapping at least one service tap connection point on a conduit, wherein the connection point includes a service tap body with an entry portion engaged with a conduit connection orifice and a service tap internal passageway extending through the service tap body for providing fluid communication between an internal portion of the conduit and the service tap internal passageway.

It one preferred and non-limiting embodiment, the method includes the steps of: (a) lining the conduit with a liner; and (b) inserting an automatic mechanism into an internal portion of the liner, wherein the automatic mechanism: (i) locates the service tap connection point; and (ii) at least partially engages a fitting device with the internal surface of the service tap entry point portion, thereby providing fluid communication between the service tap passageway and the internal portion of the liner. In a further embodiment, prior to step (a), the method further comprises the steps of: inserting the automatic mechanism into the internal portion of the conduit; wherein the automatic mechanism: (i) locates the service tap connection point on the conduit; and (ii) engages at least a portion of an insert element, which is in operable communication with a sensing target element, with the internal surface of the service tab entry portion; and removing the automatic mechanism from the conduit. In this embodiment, the automatic mechanism may locate the service tap connection point utilizing the sensing target element.

The present invention is also directed to an automatic mechanism for remotely tapping a service tap connection point on a conduit. The automatic mechanism is configured to perform one or more of the following steps: (i) locate the service tap connection point on the conduit; (ii) prepare an internal surface of the service tap entry portion of the service tap body, such that the internal surface is configured for operable engagement; (iii) engage at least a portion of an insert element, which is in operable communication with a sensing target element, with the internal surface of the service tap entry portion; (iv) locate the service tap connection point utilizing the sensing target element; and (v) at least partially engage a fitting device with the internal surface of the service tap entry portion, thereby providing fluid communication between the service tap passageway and the internal portion of the liner.

In a further embodiment, the present invention is also directed to an insert element. The insert element is used in connection with the tapping method. In one preferred and non-limiting embodiment, the insert element is configured for engagement with an internal surface of the service tap entry portion. The insert element is in operable communication with a sensing target element, and the sensing target element produces a recognizable signal. In one embodiment, the sensing target element is magnetic, and the produced recognizable signal is a magnetic wave.

The present invention is also directed to a fitting device. The fitting device is used in connection with the tapping method. In one preferred and non-limiting embodiment, the fitting device is configured to at least partially engage an internal surface of the service tap entry portion. Accordingly, the fitting device provides fluid communication between the service tap internal passageway and the internal portion of the liner. In one preferred and non-limiting embodiment, the fitting device includes a nipple element having an internal passageway for at least partially engaging the internal surface of the service tap entry portion, and a gasket element surrounding at least a portion of the nipple element and abutting an internal wall of the liner. A locking means is engaged with the nipple element in order to urge the gasket element toward the internal wall of the liner.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

Figure 1:
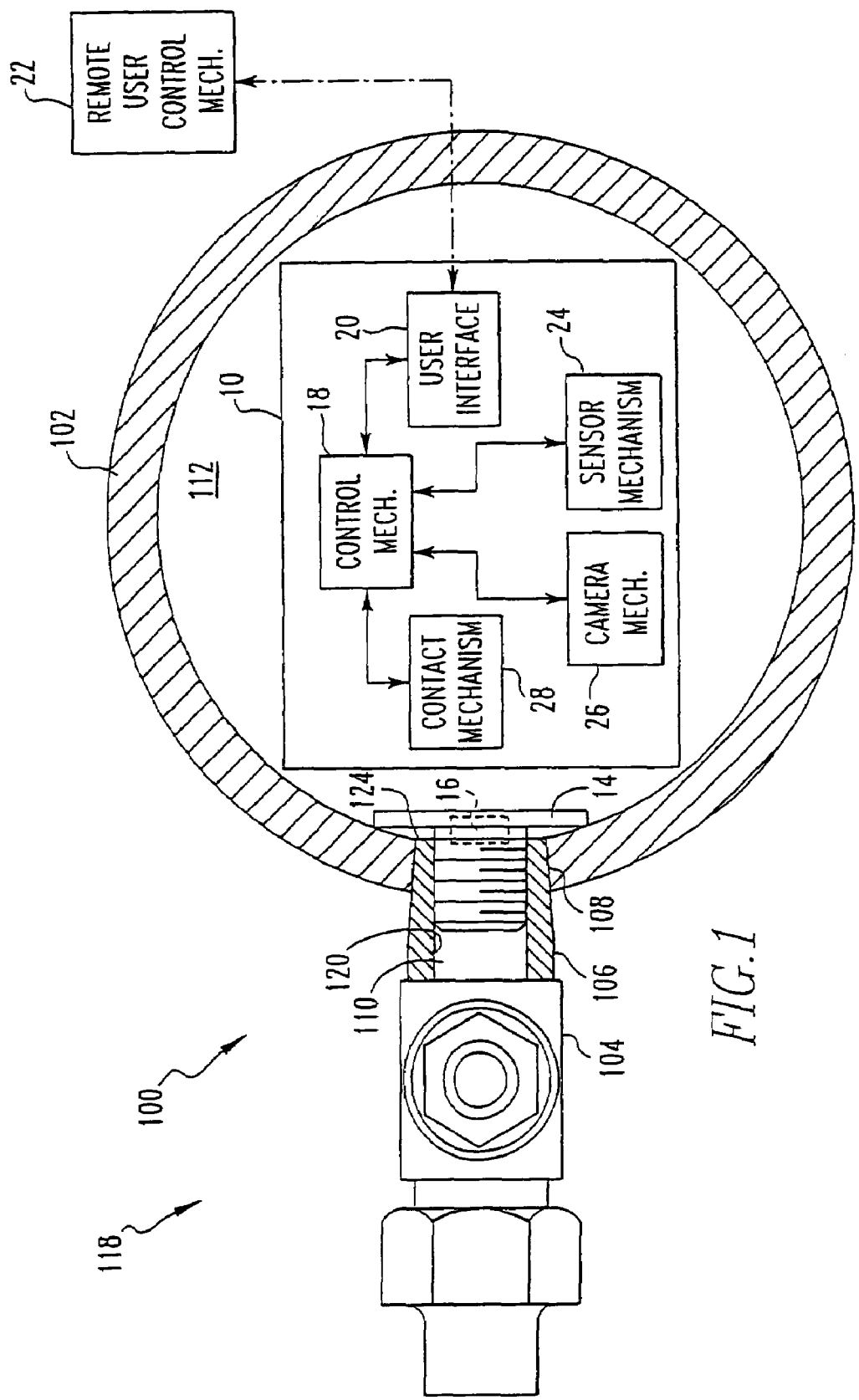
FIG. 1 is a schematic view of a first step of a method for remotely and internally tapping a conduit according to the present invention.

For purposes of the description hereinafter, the terms "upper", "lower", "right", "left", "vertical", "horizontal", "top", "bottom"; "lateral" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is a method, system and apparatus for remotely and internally tapping a service tap connection point 100 on a conduit 102. The method, system and apparatus is illustrated in various embodiments, together with various components and subcomponents of the system, in FIGS. 1-15. The present method, system and apparatus is particularly useful in connection with a host conduit lining process, wherein a host conduit is lined with a liner, e.g., a liner conduit, a liner bladder, a liner layer, a liner material, etc. The presently-invented method is performed, at least partially, by an automatic or robotic mechanism configured to effectively perform the tasks and various steps of the method.

The service tap connection point 100 includes a service tap body 104 with an entry portion 106 engaged with a conduit connection orifice 108. Further, the service tap body 104 has a service tap internal passageway 110 extending therethrough. This service tap internal passageway 110 provides fluid communication between an internal portion 112 of the conduit 102 and the service tap internal passageway 110.

The present method, system and apparatus, as discussed in detail hereinafter, is used for providing service tap fluid communication with an internal portion 114 of a liner 116. As discussed hereinabove, when initially constructing a water main conduit in a trench, the conduit 102 is fitted with various service taps 118, and these service taps 118 are used to draw water from the main conduit 102 and provide controlled flow through a service conduit or line (not shown). In the lining process, the liner 116 will block the service taps 118. In normal operation, fluid, and typically water is capable of flowing from the internal portion 112 of the conduit 102, through the service tap connection point 100, specifically through the conduit connection orifice 108 and the service tap internal passageway 110, and into a service line or a conduit for distribution.

In a preferred and non-limiting embodiment, the presently invented method includes the steps of lining the conduit 102 with a liner 116 and inserting an automatic mechanism 10 into the internal portion 114 of the liner 116. The automatic mechanism 10 locates the service tap connection point 100 and engages a fitting device 12 with an internal surface 120 of the service tap entry portion 106. In this manner, fluid communication is provided between the service tap internal passageway 110 and the internal portion 114 of the liner 116.

It is envisioned that, prior to lining the conduit 102 with a liner 116, the method further comprises the steps of inserting the automatic mechanism 10 into the internal portion 112 of the conduit 102. Next, the automatic mechanism 10 locates the service tap connection point 100 and engages at least a portion of an insert element 14, which is in operable communication with a sensing target element 16 with the internal surface 120 of the service tap entry portion 106. Finally, the automatic mechanism 10 is removed from the conduit 102 prior to the lining process. In this embodiment, when the automatic mechanism 10 is reinserted into the lined conduit 102, the automatic mechanism 10 is able to locate the service tap connection point 100 utilizing the sensing target element 16.

Prior to engaging the insert element 14 and sensing target element 16 with the service tap entry portion 106, the automatic mechanism 10 may also prepare the internal surface 120 of the entry portion 106 for engagement. Specifically, the service tap entry portion 106 of the service tap body 104 should be prepared such that the insert element 14 may be engaged therein. Such preparation may constitute preparing, cutting or grinding the internal surface 120 of the entry portion 106, such as by placing threads, grooves, indentations or some mating surface thereon.

The sensing target element 16 may be positioned on, within or manufactured integrally with the insert element 14, such that when the insert element 14 is engaged with the service tap entry portion 106, the sensing target element 16 is aligned with a distal end 124 of the service tap entry portion 106. It is envisioned that the sensing target element 16 may be any element whose location can be determined using communicating or sensing equipment. For example, the sensing target element 16 may be a magnet, and the automatic mechanism 10 may include components that can sense magnetic waves. However, the sensing target element 16 may be any target that emits signals that may be sensed, such as infrared, sonic, isotopic, radio, microwave and similar signals. After the lining process, and since the service tap connection point 100 will be covered, the automatic mechanism 10 uses the sensing target element 16 on the insert element 14 to locate the service tap entry portion 106. In addition, the placement of the insert element 14 and sensing target element 16 at the service tap connection point 100 can be repeated for each and every service tap connection point 100 throughout and along the conduit 102 and conduit system. After each service tap connection point 100 is marked by the insert element 14, thus making it locatable after the lining process, the automatic mechanism 10 is removed from the internal portion 112 of the conduit 102.

After the liner 116 is appropriately installed in the conduit 102, the automatic mechanism 10 is reinserted in the internal portion 114 of the liner 116 and locates the service tap connection point 100 using the sensing target element 16. In one preferred and non-limiting embodiment, the insert element 14 and sensing target element 16 are removed prior to engagement of the fitting device 12 with the service tap entry portion 106. Whether or not removed, the engagement and disengagement of the fitting device 12, the insert element 14 and/or any of the other components or subcomponents of the system may be accomplished via the automatic mechanism 10. Accordingly, the automatic mechanism 10 may be a robot, which is configured to travel within both the internal portion 112 of the conduit 102 and the internal portion 114 of the liner 116. The modifications required to an automatic mechanism 10 to make it mobile within the conduit 102 or the liner 116 are known in the art, and may include such components as wheels, tracks, treads or other mobility-enabling structures or mechanisms. Further, the automatic mechanism 10 may include further components to achieve a variety of different functions and results within the internal portion 112 of the conduit 102 and the internal portion 114 of the liner 116. For example, the automatic mechanism 10 may include a control mechanism 18 for controlling one or more of the components or subcomponents and operation of the automatic mechanism 10. The automatic mechanism 10 may also include a user interface 20 that is in communication with a remote user control mechanism 22. Such communication may be achieved through a variety of processors and signals as is known in the art. For example, the communication may be hard-wired or wireless, infrared, radio frequency, and/or other signal-based technologies as is known in the art.

The automatic mechanism 10 may also include one or more sensor mechanisms 24 to sense an operating parameter of the automatic mechanism 10 and/or a physical characteristic of a surrounding environment. For example, the sensor mechanism 24 may be capable of sensing the signals emanating from the sensing target element 16 for location of the service tap connection point 100. The sensor mechanism 24 may also sense various system states and environmental states in the liner 116, the conduit 102, the service tap connection point 100 and surrounding areas. Still further, the sensor mechanism 24 may be used to receive, process and transmit various signals relating to the operation of the automatic mechanism 10 for maintenance, trouble shooting, operation and system efficiency improvement.

The automatic mechanism 10 may also include a camera mechanism 26 for providing visual feedback to the remote user control mechanism 22. In this manner, the user may visually inspect the process of operation of the automatic mechanism 10 as it travels through and functions within the internal portion 112 of the conduit 102 and the internal portion 114 of the liner 116. Further, the user may be able to control the automatic mechanism 10 using the visual feedback from the camera mechanism 26. It is also envisioned that the automatic mechanism 10 include a contact mechanism 28 capable of preparing a surface, boring an orifice, manipulating a component of the system, such as the fitting device 12, the insert element 14, the sensing target element 16, etc. For example, in one preferred and non-limiting embodiment, in order to effectively remove the insert element 14 and engage the fitting device 12 with the service tap entry portion 106, the automatic mechanism 10 may include appropriate components for boring an orifice through the liner 116 in order to provide fluid communication between the internal portion 114 of the liner 116 and the service tap connection point 100.

Returning to the method of the present invention, and as discussed above in connection with the automatic mechanism 10, fluid communication must be provided between the service tap connection point 100 and a service line, such that fluid material flows from the conduit 102 through the service tap connection point 100 and into the service line. After a lining process, an orifice must be bored in the liner 116, typically by the automatic mechanism 10, through a liner wall 126, such that the orifice is substantially in line with the service tap internal passageway 110. In this manner, fluid communication is provided between the internal portion 114 of the liner 116 and a service liner conduit via the service tap connection point 100.

Figure 2:
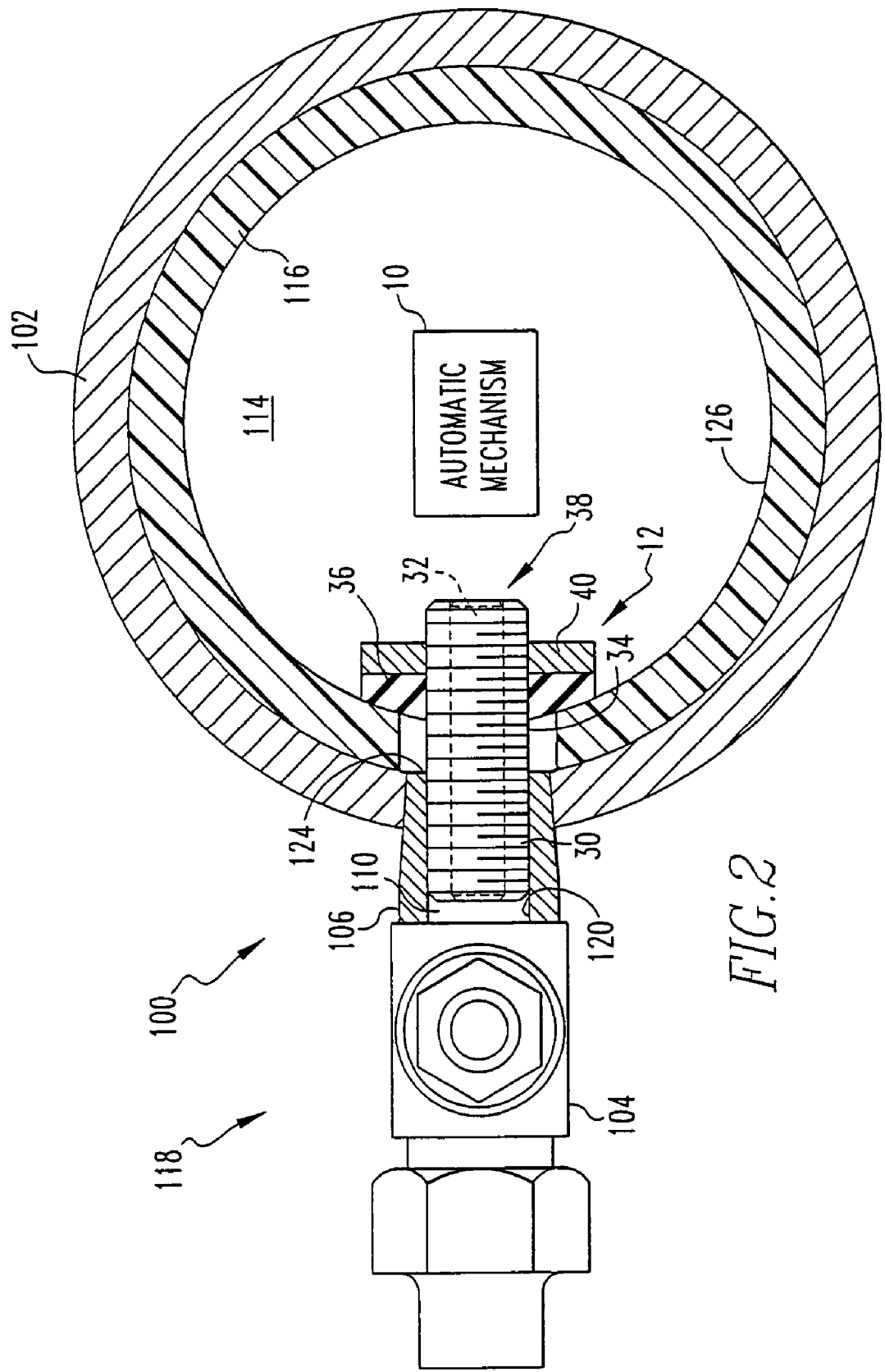
FIG. 2 is a schematic view of a further step of the method for remotely and internally tapping a conduit according to the present invention.

As seen in FIG. 2, in one preferred and non-limiting embodiment, once the insert element 14 and sensing target element 16 are removed from the service tap connection point 100, and after the lining process, the fitting device 12 is engaged with the service tap entry portion 106. In this embodiment, the fitting device 12 includes a nipple element 30 having a nipple element internal passageway 32 extending therethrough. Specifically, the nipple element 30 is engaged with the service tap entry portion 106 through a variety of methods, as discussed hereinafter. In the embodiment illustrated in FIG. 2, a nipple element outer surface 34 includes threads capable of mating with a threaded portion of the service tap entry portion 106, and specifically the service tap internal passageway 110. At this point, the automatic mechanism 10 has already prepared the service tap internal passageway 110 for connection, such as by placing mating threads thereon. After the nipple element 30 is engaged with the service tap internal passageway 110 at the service tap entry portion 106, a gasket element 36 is fitted over a distal end of the nipple element 30 for sealing the conduit connection orifice 108 with respect to the internal portion 114 of the liner 116 and the nipple element 30 (excluding the intended fluid communication through the service tap internal passageway 110 of the nipple element 30). In particular, the gasket element 36 abuts the liner wall 126 in an area immediately adjacent the nipple element 30. The gasket element 36 may also be attached to the liner 116 via an adhesive, glue, fusion, electrofusion, etc.

Finally, a locking means 38 is engaged with the nipple element 30 for urging the gasket element 36 against the liner wall 126. Accordingly, the nipple element 30 is engaged with the service tap entry portion 106 and sealed fluid communication is provided between the internal portion 114 of the liner 116 and the service tap internal passageway 110. In one preferred and non-limiting embodiment, the locking means 38 is a locking nut 40 capable of threadedly engaging the nipple element 30. Specifically, the locking nut 40 includes thread grooves capable of mating with the threads disposed on the nipple element outer surface 34.

Figure 3:
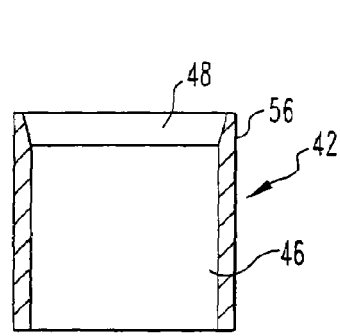
FIG. 3 is a side sectional view of a swage sleeve of a fitting device according to the present invention.
Figure 4:
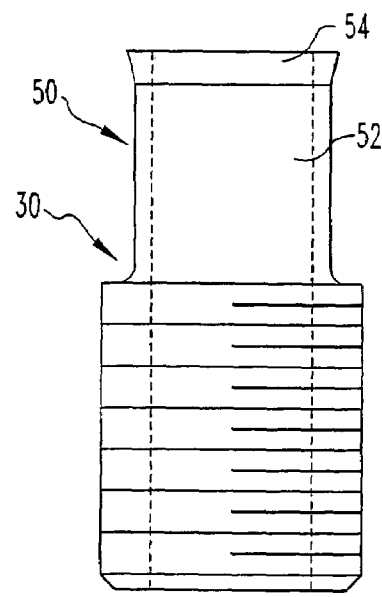
FIG. 4 is a side sectional view of a swage spreader portion of the fitting device of FIG. 3.
Figure 5:
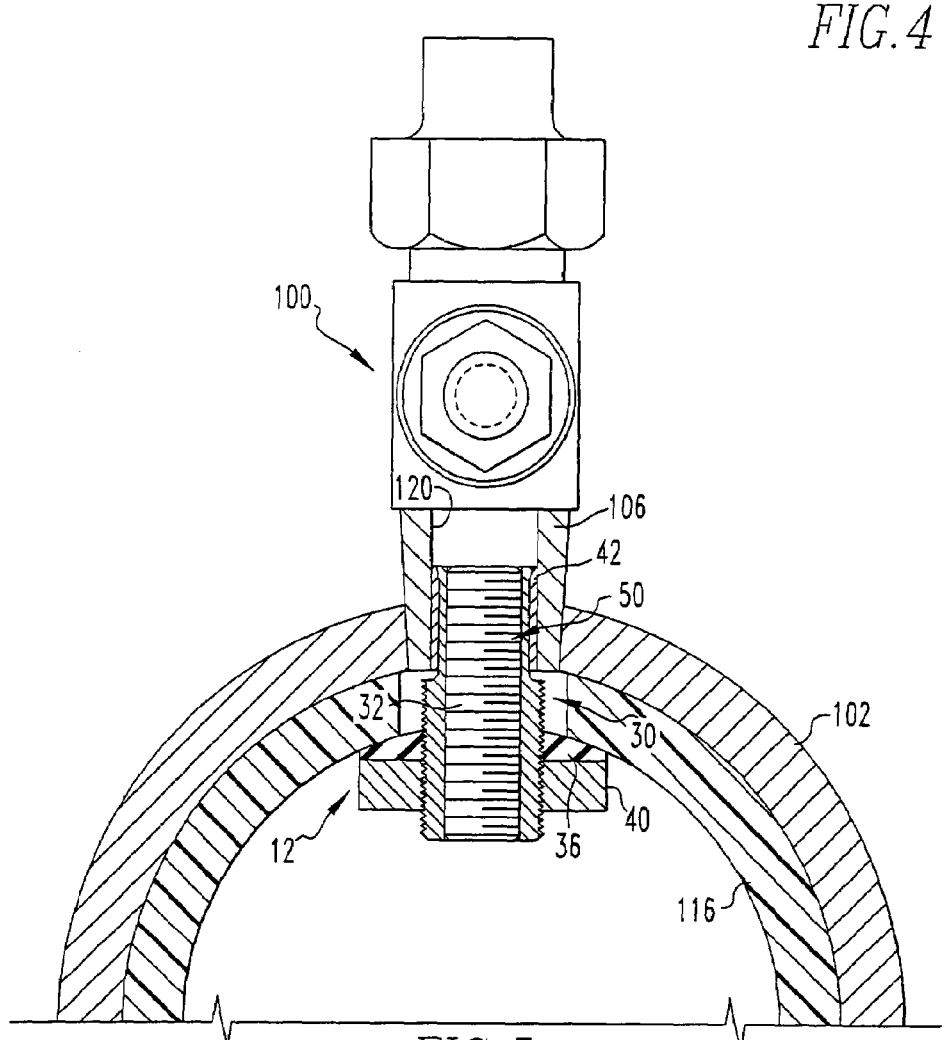
FIG. 5 is a side sectional view of a fitting device engaged with a conduit and liner according to the method of the present invention.

Another preferred and non-limiting embodiment is illustrated in FIGS. 3-5. In this embodiment, the fitting device 12 includes a swage sleeve 42 positioned within and abutting the internal surface 120 of the service tap entry portion 106. The swage sleeve 42 includes a swage sleeve internal passageway 46 extending therethrough and having a tapered rim portion 48. In this embodiment, the nipple element 30 includes a swage spreader portion 50 having a neck portion 52 and a tapered rim portion 54 at an end thereof. The neck portion 52 is engaged within the swage sleeve internal passageway 46, such that the tapered rim portion 54 of the neck portion 52 is engaged with the tapered rim portion 48 of the swage sleeve 42.

As discussed above, a gasket element 36 is placed over and surrounds the nipple element 30, and the locking means 38, for example the locking nut 40, is engaged with the nipple element 30. When the locking nut 40 is engaged with the nipple element 30, the swage spreader portion 50 is pulled, thereby urging the swage sleeve outer surface 56 toward the internal surface 120 of the service tap entry portion 106 via the tapered rim portion 54 of the neck portion 52. In this manner, the nipple element 30 is effectively engaged within and sealed with respect to the service tap entry portion 106.

Figure 6:
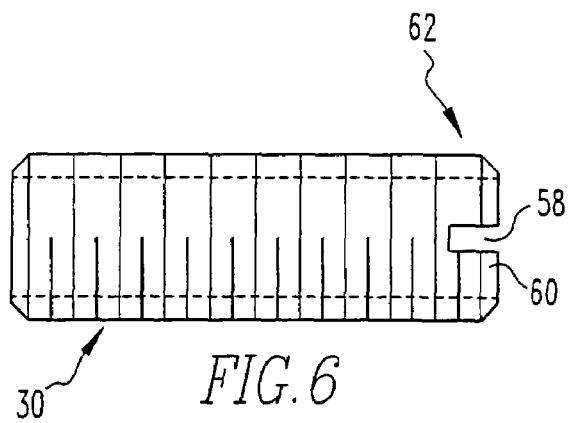
FIG. 6 is a side view of a nipple element of a fitting device according to the present invention.
Figure 7:
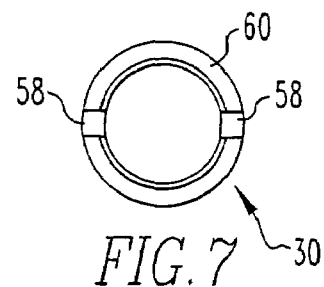
FIG. 7 is a top view of the nipple element of FIG. 6.
Figure 8A:
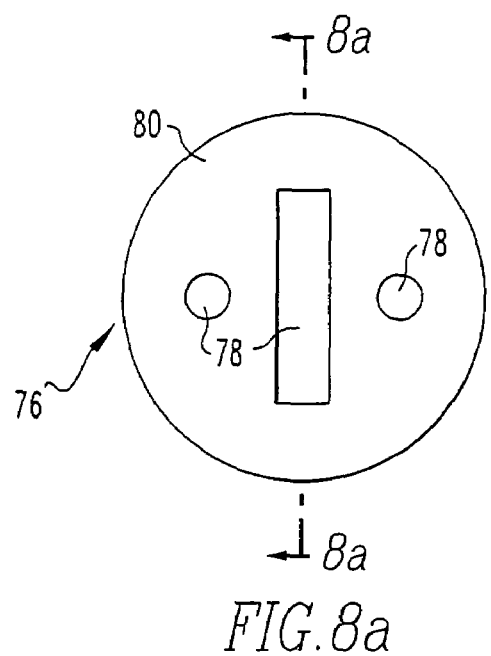
FIGS. 8(a)-8(e) are top and side views of various embodiments of a tool element according to the present invention.
Figure 8B:
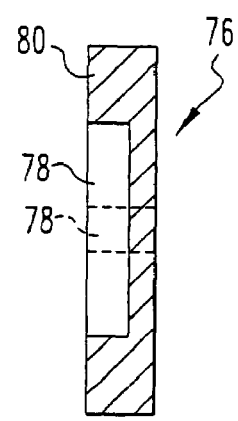
Figure 8C:
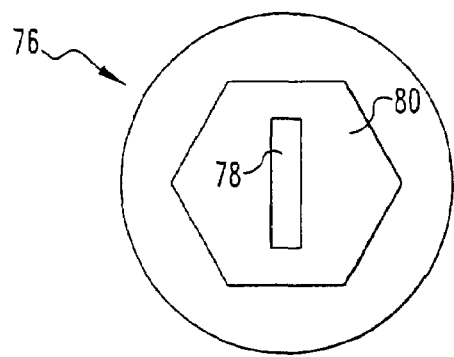
Figure 8D:
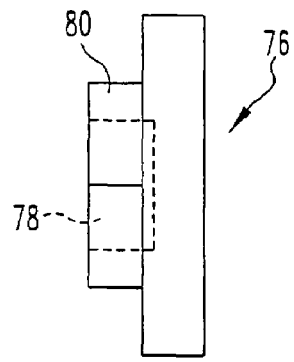
Figure 8E:
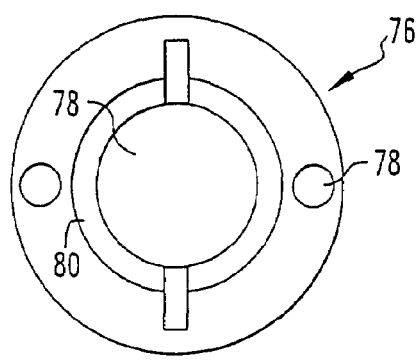

In order to engage the nipple element 30 with the service tap entry portion 106, the nipple element 30 may also include a nipple element engagement recess 58 and/or a nipple element engagement projection 60. Specifically, the nipple element engagement recess 58 and/or the nipple element engagement projection 60 would be positioned on the nipple element distal end 62 and configured for optimal engagement with a tool element 76. The tool element 76 includes one or more tool element engagement recesses 78 and one or more tool element engagement projections 80. Specifically, the tool element engagement recesses 78 are sized and shaped so as to mate with the nipple element engagement projections 60, while the tool element engagement projections 80 are sized and shaped so as to mate with the nipple element engagement recesses 58. Various embodiments of the tool element 76, together with the tool element engagement recesses 78 and the tool element engagement projections 80 are illustrated in FIGS. 8(a)-8(e). Accordingly, when the tool element 76 is engaged with the nipple element 30 via the nipple element engagement recess 58 or nipple element engagement projection 60, and when the tool element 76 is rotated, the nipple element 30 is correspondingly rotated. Accordingly, the tool element 76 includes a surface capable of mating with the nipple element engagement recess 58 and/or the nipple element engagement projection 60. Still further, the tool element 76 can be positioned on the automatic mechanism 10 in order to allow the automatic mechanism 10 to perform the engaging function. One embodiment of the nipple element 30, including the nipple element engagement recess 58 and/or the nipple element engagement projection 60, is illustrated in FIGS. 6-7.

Figure 9:
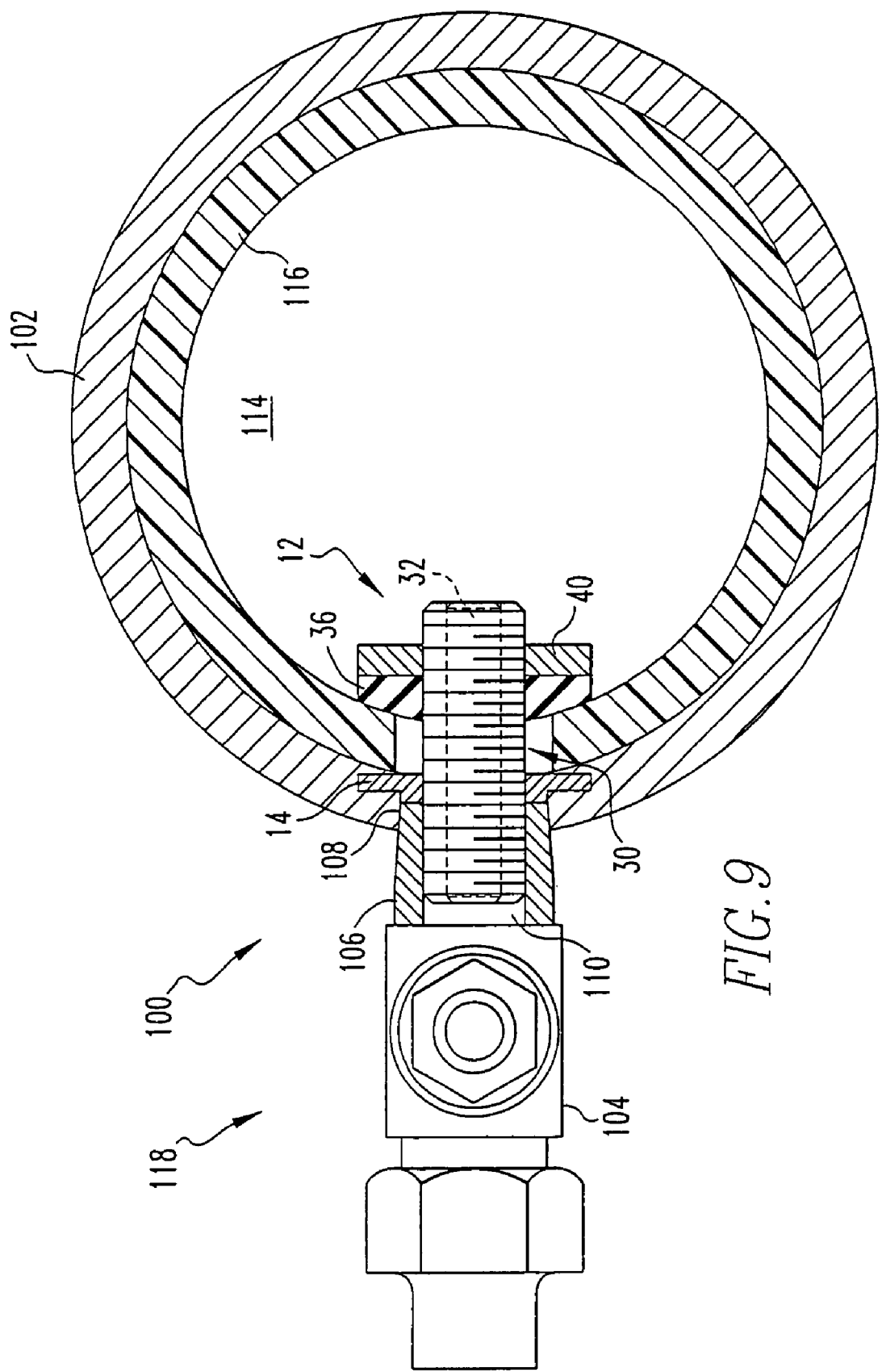
FIG. 9 is a side sectional view of a further embodiment of a fitting device attached to a conduit and liner according to the method of the present invention.

Another preferred and non-limiting embodiment of the present invention is illustrated in FIG. 9. As seen in this embodiment, while the sensing target element 16 is removed after location of the service tap connection point 100, the insert element 14 remains engaged with and abutting the service tap entry portion 106. Specifically, the insert element 14 remains in place while the fitting device 12 is engaged with the service tap entry portion 106 for providing an additional engagement surface and sealing function. Such an arrangement may be preferable to attain better sealing between the service tap entry portion 106 and the conduit connection orifice 108 on the conduit 102.

Figure 10A:
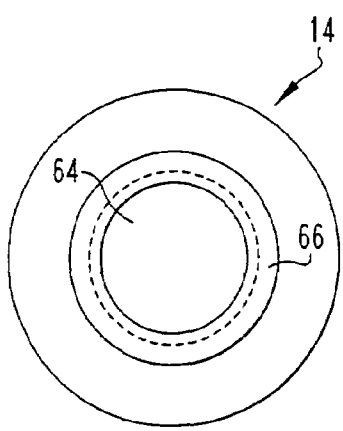
FIGS. 10(a)-10(c) are top and side views of one embodiment of an insert element according to the present invention.
Figure 10B:
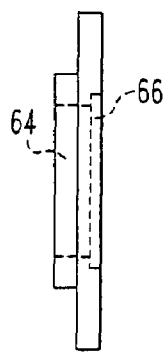
Figure 10C:
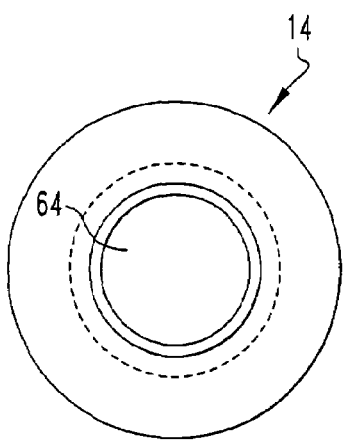
Figure 11A:
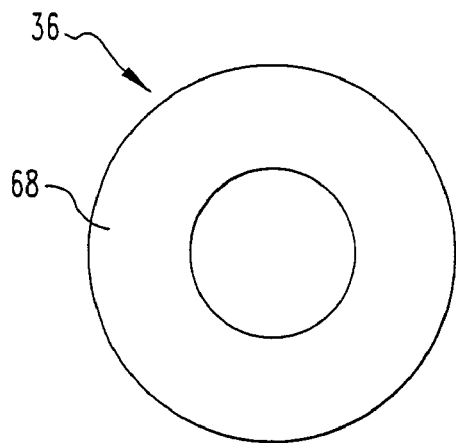
FIGS. 11(a)-11(b) are top and side views of a gasket element of a fitting device according to the present invention.
Figure 11B:
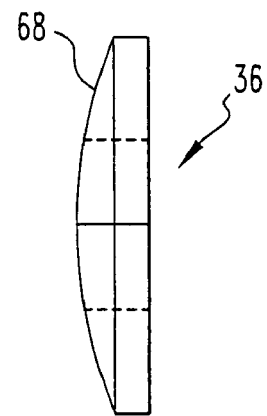
Figure 12A:
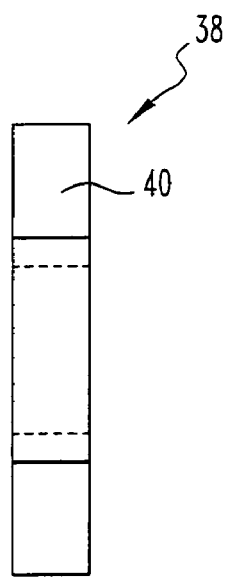
FIGS. 12(a)-12(b) are top and side views of a locking nut of a fitting device according to the present invention.
Figure 12B:
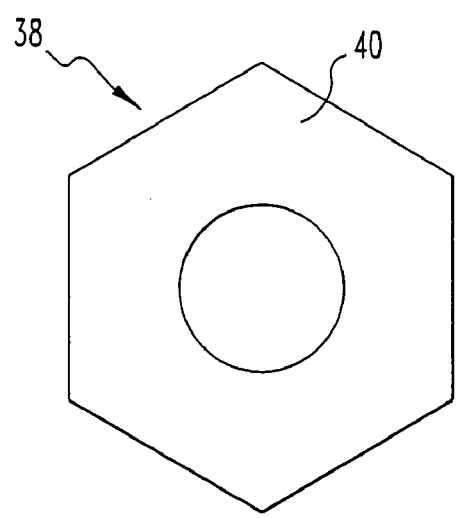

One preferred embodiment of the insert element 14 is illustrated in FIG. 10. As seen in this embodiment, the insert element 14 includes an insert element orifice 64 and an insert element rim portion 66. Accordingly, the sensing target element 16 may be positioned within the insert element orifice 64 and abutting the insert element rim portion 66. However, as discussed above, if the insert element 14 is to be left in the engaged relationship while the sensing target element 16 is removed, the insert element orifice 64 still allows fluid communication between the internal portion 112 of the conduit 102 and the service tap connection point 100. A preferred embodiment of the gasket element 36 is illustrated in FIG. 11. The gasket element 36 includes a rounded face 68 formed to appropriately contact and seal against the liner wall 126, which is also rounded. Further, one preferred embodiment of the locking nut 40 is illustrated in FIG. 12, wherein the locking nut 40 is a hexagonal structure.

Figure 13:
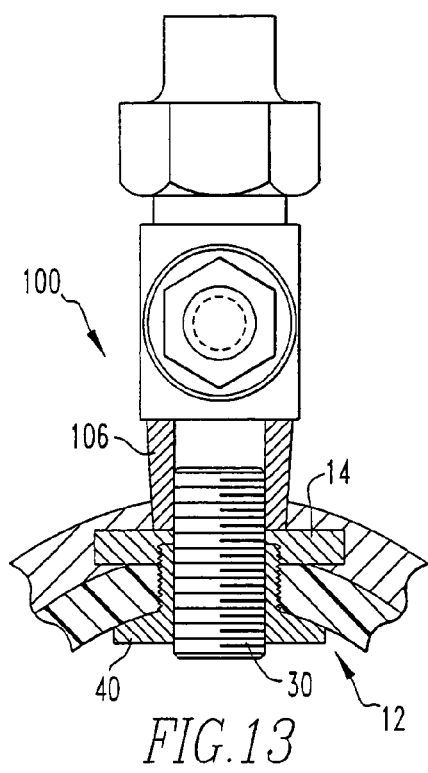
FIG. 13 is a side sectional view of a preferred embodiment of a fitting device engaged with a conduit and liner according to the method of the present invention.
Figure 14:
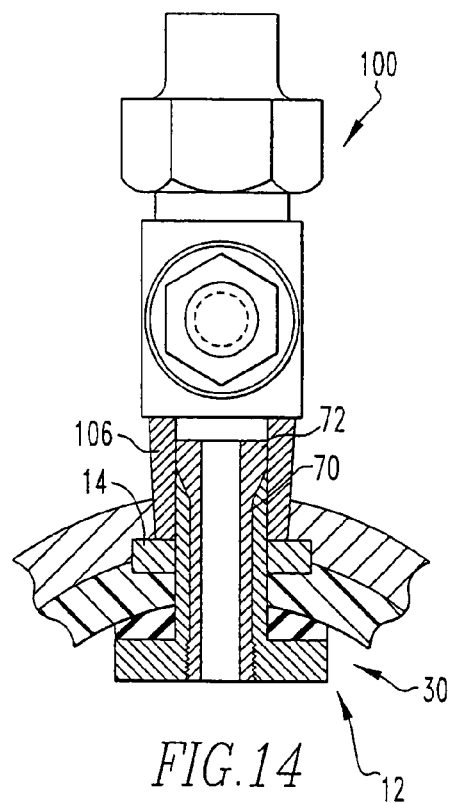
FIG. 14 is a side sectional view of a further embodiment of a fitting device engaged with a conduit and liner according to the method of the present invention.
Figure 15:
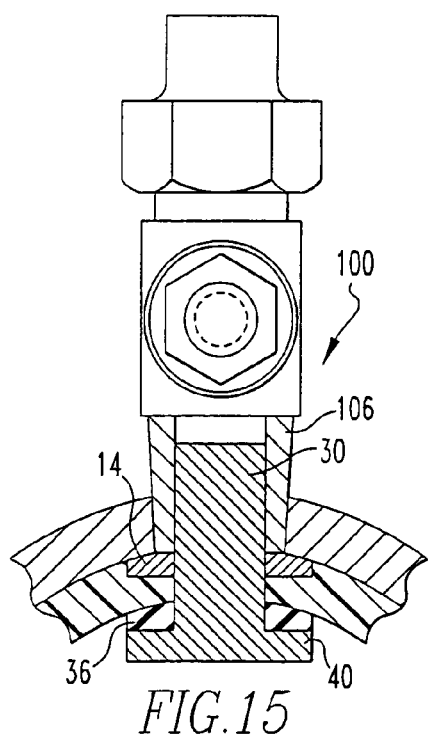
FIG. 15 is a still further embodiment of a fitting device engaged with a conduit and liner according to the method of the present invention.

Multiple envisioned fittings, systems and apparatus for the fitting device 12 are illustrated in FIGS. 13-15. In FIG. 13, the above-discussed threaded nipple element 30 configuration is utilized. In the embodiment of FIG. 13, the insert element 14 is left in place, and the gasket element 36 is not used. Instead, the locking means 38 surrounds and seals the nipple element 30 with respect to the liner wall 126. For example, the locking means 38 may be a locking nut 40 that is either constructed from or coated with a material that allows for a sealing relationship between the nipple element 30 and the liner wall 126. Further, the locking nut 40 may be sized and shaped as to mate with the liner wall 126.

In the embodiment illustrated in FIG. 14, the fitting device 12 includes a nipple element 30 having an expandable portion 70 with a rim portion 72 positioned on the expandable portion 70. Either the locking means 38, such as the locking nut 40, or a further shafted element is engaged with the nipple element 30. This forces a wall 74 of the expandable portion 70 outward and in a contacting/engaging relationship with the internal surface 120 of the service tap entry portion 106, specifically with the rim portion 72 of the nipple element 30 engaging against the internal surface 120.

A further embodiment of the fitting device 12 is illustrated in FIG. 15. In this embodiment, the nipple element 30 does not include threads, and instead is sized and shaped so as to be frictionally engaged within the service tap internal passageway 110 at the service tap entry portion 106. In particular, the nipple element 30 and the locking means 38 may constitute the same structure, with the nipple element internal passageway 32 extending through both the nipple element 30 and the locking means 38. In order to provide the engagement, the nipple element 30 and/or the locking means 38 may be beveled, tapered, etc. Further, any of the various components discussed above in connection with the fitting device 12 and/or the insert element 14 may be manufactured from or coated with a material that provides a sealing relationship with a mating surface, for example rubber, a polymer or the like.

The automatic mechanism 10 performs the vast majority of the functions and steps of the presently-invented method. For example, the automatic mechanism 10 or robot may locate the service tap connection point 100, ream or prepare the service tap entry portion 106, perform facing operations, tap or cut threads, force fit the apparatus, provide visual or other similar feedback to a user, etc. In this manner, the present invention provides a remote tapping method, system and apparatus for internally tapping a conduit 102 for providing fluid communication between the internal portion 114 of the liner 116, through the service tap connection point 100 and into a service line. The present invention eliminates the need for excavating a buried conduit 102 in order to position and reestablish service tap connection points 100. Further, the present invention utilizes the automatic mechanism 10 to locate, prepare and reestablish a service tap connection point 100 from within the conduit 102.

This invention has been described with reference to the preferred embodiments. Obvious modifications and alterations will occur to others upon reading and understanding the preceding detailed description. It is intended that the invention be construed as including all such modifications and alterations.

What is claimed is:

1. A method for remotely tapping at least one service tap connection point on a conduit, the connection point having a service tap body with an entry portion engaged with a conduit connection orifice and a service tap internal passageway extending through the service tap body for providing fluid communication between an internal portion of the conduit and the service tap internal passageway, the method comprising:
   inserting an automatic mechanism into the internal portion of the conduit, wherein the automatic mechanism:
      (i) locates the service tap connection point; and
      (ii) prepares the internal surface of the service tap entry portion for lining of the conduit;
   removing the automatic mechanism from the conduit;
   lining the conduit with a liner; and
   inserting the automatic mechanism into an internal portion of the liner, wherein the automatic mechanism:
      (i) locates the service tap connection point; and
      (ii) at least partially engages a fitting device with an internal surface of the service tap entry portion, thereby providing fluid communication between the service tap internal passageway and the internal portion of the liner.

2. The method of claim 1, further comprising removing the automatic mechanism from the internal portion of the liner.

3. The method of claim 1, wherein the automatic mechanism is a robot configured to travel within at least one of the internal portion of the conduit and the internal portion of the liner.

4. The method of claim 1, further comprising providing fluid communication between the service tap connection point and a service line, such that fluid material flows from the conduit to the service line.

5. The method of claim 1, further comprising boring an orifice, by the automatic mechanism, through a wall of the liner, such that the liner orifice is substantially in line with the service tap internal passageway.

6. A method for remotely tapping at least one service tap connection point on a conduit, the connection point having a service tap body with an entry portion engaged with a conduit connection orifice and a service tap internal passageway extending through the service tap body for providing fluid communication between an internal portion of the conduit and the service tap internal passageway, the method comprising:
   lining the conduit with a liner;
   inserting an automatic mechanism into an internal portion of the liner, wherein the automatic mechanism:
      (i) locates the service tap connection point; and (ii) at least partially engages a fitting device with an internal surface of the service tap entry portion, thereby providing fluid communication between the service tap internal passageway and the internal portion of the liner, wherein the fitting device comprises a nipple portion and a locking portion; and directly or indirectly sealingly engaging the locking portion of the fitting device with an internal wall of the liner.

7. The method of claim 6, wherein, prior to engaging the locking portion, the method further comprises positioning a gasket element at least partially around at least a portion of at least one of the nipple portion and the locking portion in an abutting relationship with the internal wall of the liner, such that the engaging the locking portion with the internal wall of the liner compresses the gasket element directly against the internal wall of the liner.

8. A fitting device for use in connection with tapping at least one service tap connection point on a conduit, an internal surface of the conduit being lined with a liner having an internal portion, the connection point having a service tap body with an entry portion engaged with a conduit connection orifice and a service tap internal passageway extending through the service tap body for providing fluid communication between an internal portion of the conduit and the service tap internal passageway, the fitting device comprising:

(i) a nipple portion configured to at least partially engage an internal surface of the service tap entry portion, thereby providing fluid communication between the service tap passageway and an internal portion of the liner; and (ii) a locking portion configured to directly or indirectly sealingly engage the fitting device with an internal wall of the liner.

9. The device of claim 8, further comprising a gasket element positioned around at least a portion of at least one of the nipple portion and the locking portion in an abutting relationship with the internal wall of the liner, such that the gasket element is compressed directly against the internal wall of the liner when the nipple portion is at least partially engaged with the internal surface of the service tap entry portion.

10. The device of claim 8, wherein the nipple portion and the locking portion of the fitting device are formed as an integral structure.

11. A method for remotely tapping at least one service tap connection point on a conduit, the connection point having a service tap body with an entry portion engaged with a conduit connection orifice and a service tap internal passageway extending through the service tap body for providing fluid communication between an internal portion of the conduit and the service tap internal passageway, the method comprising:

lining the conduit with a liner; and inserting an automatic mechanism into an internal portion of the liner, wherein the automatic mechanism:

(i) locates the service tap connection point; and (ii) at least partially engages a fitting device with an internal surface of the service tap entry portion, thereby providing fluid communication between the service tap internal passageway and the internal portion of the liner.

12. The method of claim 11, wherein the automatic mechanism locates the service tap connection point by sensing the location thereof.

13. The method of claim 11, further comprising the step of removing the automatic mechanism from the internal portion of the liner.

14. The method of claim 11, wherein the automatic mechanism is a robot configured to travel within at least one of the internal portion of the conduit and the internal portion of the liner.

15. The method of claim 11, further comprising the step of boring an orifice, by the automatic mechanism, through a wall of the liner, such that the liner orifice is substantially in line with the service tap internal passageway.

16. The method of claim 11, wherein the fitting device comprises a nipple portion configured to at least partially engage an internal surface of the service tap entry portion, thereby providing fluid communication between the service tap passageway and an internal portion of the liner; and a locking portion configured to directly or indirectly sealingly engage the fitting device with an internal wall of the liner.

17. The method of claim 16, wherein the nipple portion and the locking portion of the device are formed as an integral structure.

18. An automatic mechanism for remotely tapping at least one service tap connection point on a conduit, the connection point having a service tap body with an entry portion engaged with a conduit connection orifice and a service tap internal passageway extending through the service tap body for providing fluid communication between an internal portion of a conduit and the service tap internal passageway, the automatic mechanism configured to at least:

(i) locate the service tap connection point;

(ii) prepare an internal surface of a service tap entry portion of the service tap body, such that the internal surface is configured for operable engagement with the internal portion of the conduit; and (iii) at least partially engage a fitting device with the internal surface of the service tap entry portion, thereby providing fluid communication between the service tap passageway and an internal portion of a liner, which lines at least a portion of the internal portion of the conduit.

19. The automatic mechanism of claim 18, wherein the automatic mechanism is a robot configured to travel within at least one of the internal portion of the conduit and the internal portion of the liner.

20. The automatic mechanism of claim 18, wherein the automatic mechanism further comprises at least one of the following:

(i) a control mechanism configured to control at least one of a component and operation of the automatic mechanism;

(ii) a user interface configured to communicate with a remote user control mechanism;

(iii) at least one sensor mechanism to sense at least one of an operating parameter of the automatic mechanism and a physical characteristic of a surrounding environment;

(iv) a camera mechanism configured to provide visual feedback to a remote user control mechanism; and (v) a contact mechanism configured to at least one of: prepare a surface for engagement; bore an orifice; manipulate a component or any combination thereof, or any combination thereof.

* * * * *

UNITED STATES PATENT AND TRADEMARK OFFICE
CERTIFICATE OF CORRECTION

| | |
|---|---|
| PATENT NO. | : 7,710,281 B2 |
| APPLICATION NO. | : 11/903518 |
| DATED | : May 4, 2010 |
| INVENTOR(S) | : Smith et al. |

It is certified that error appears in the above-identified patent and that said Letters Patent is hereby corrected as shown below:

Column 12, Line 20, Claim 17, "of the device" should read -- of the fitting device --

Signed and Sealed this

Twenty-first Day of September, 2010

David J. Kappos
*Director of the United States Patent and Trademark Office*